United States Patent
List et al.

(10) Patent No.: US 7,785,721 B2
(45) Date of Patent: Aug. 31, 2010

(54) THERMALLY TREATABLE LAYER ASSEMBLY THAT FILTERS SUN AND HEAT AND METHOD FOR PRODUCING THE SAME

(75) Inventors: Matthias List, Dresden (DE); Falk Milde, Dresden (DE); Christoph Koeckert, Radebeul (DE); Joerg Fiukowski, Torgau (DE)

(73) Assignee: Von Ardenne Anlagentechnik GmbH, Dresden (DE)

( * ) Notice: Subject to any disclaimer, the term of this patent is extended or adjusted under 35 U.S.C. 154(b) by 706 days.

(21) Appl. No.: 10/580,504

(22) PCT Filed: Nov. 25, 2004

(86) PCT No.: PCT/DE2004/002613

§ 371 (c)(1),
(2), (4) Date: Jul. 24, 2007

(87) PCT Pub. No.: WO2005/051855

PCT Pub. Date: Jun. 9, 2005

(65) Prior Publication Data
US 2007/0273991 A1    Nov. 29, 2007

(30) Foreign Application Priority Data
Nov. 28, 2003    (DE)    ................. 103 56 357

(51) Int. Cl.
B32B 15/04    (2006.01)
B05D 1/00    (2006.01)
(52) U.S. Cl. .............. 428/699; 428/426; 428/689; 428/698; 428/701; 427/124; 427/294; 427/350
(58) Field of Classification Search ............ 428/426, 428/689, 698, 699, 701; 427/124, 294, 350
See application file for complete search history.

(56) References Cited

U.S. PATENT DOCUMENTS

| | | | | |
|---|---|---|---|---|
| 5,085,926 A | * | 2/1992 | Iida et al. ................ | 428/216 |
| 5,563,734 A | | 10/1996 | Wolfe et al. ............. | 359/360 |

(Continued)

FOREIGN PATENT DOCUMENTS

CA    2120875    10/1994

(Continued)

*Primary Examiner*—Jennifer C McNeil
*Assistant Examiner*—Lauren Robinson
(74) *Attorney, Agent, or Firm*—Heslin Rothenberg Farley & Mesiti P.C.

(57) ABSTRACT

A layer system that filters sun and heat can be applied to glass by a vacuum coating process. The system comprises at least one series of metal layers in addition to a respective series of lower dielectric layers and a respective series of upper dielectric layers. At least one series of metal layers and one series of upper and lower dielectric layers are configured as a sandwich system, wherein one metal layer is encapsulated by an upper and a lower intermediate layer consisting of hypostoichiometrically nitrided or oxidized metal of the metal layer and sandwich systems of the series of layers contain individual sandwich layers of a stoichiometric and hypostoichiometric oxide or nitride of a metal or semiconductor. An oxygen or nitrogen deficit of the sandwich layers increases towards a neighboring sandwich system and the oxide and nitride layers are produced in a vacuum coating process.

21 Claims, 1 Drawing Sheet

U.S. PATENT DOCUMENTS

| | | | | |
|---|---|---|---|---|
| 6,159,607 | A | 12/2000 | Hartig | 428/426 |
| 6,524,714 | B1 | 2/2003 | Neuman et al. | 428/428 |
| 2003/0044652 | A1* | 3/2003 | Wang | 428/699 |
| 2003/0049463 | A1 | 3/2003 | Wang | |

FOREIGN PATENT DOCUMENTS

| | | |
|---|---|---|
| DE | 19640800 | 4/1998 |
| DE | 69618381 | 8/2002 |
| DE | 10115196 | 10/2002 |
| DE | 10131932 | 1/2003 |
| EP | 0622645 | 11/1994 |
| EP | 0 646 551 | 4/1995 |
| WO | WO99/43626 | 9/1999 |
| WO | WO02/092527 | 11/2002 |
| WO | 03048064 | 6/2003 |

* cited by examiner

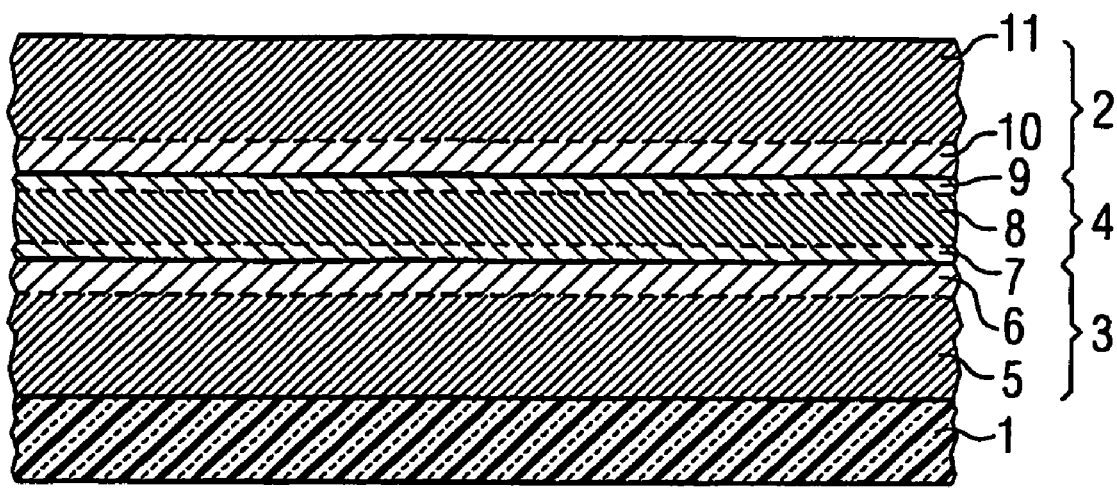

THERMALLY TREATABLE LAYER ASSEMBLY THAT FILTERS SUN AND HEAT AND METHOD FOR PRODUCING THE SAME

CROSS-REFERENCE TO RELATED APPLICATIONS

This is a section 371 filing of international application PCT/DE2004/002613 filed on Nov. 25, 2004 and published, in German, as international publication no. WO 2005/051855 A2 on Jun. 9, 2005, which claims priority of German application no. 103 56 357.1 filed on Nov. 28, 2003, which applications are hereby incorporated by reference herein in their entirety.

BACKGROUND OF THE INVENTION

The invention relates to a layer system that filters sun and heat and can be applied to glass by means of a vacuum coating process. Said system comprises at least one series of metal layers in addition to a respective series of lower dielectric layers that are positioned directly below said assembly and a respective series of upper dielectric layers that are positioned directly above said assembly as well as a method for producing the same in which the individual layers can be applied successively to a glass substrate by means of vacuum coating.

Such layer systems applied to glass by means of vacuum coating are mainly used in architecture for window and facade design and in the automobile industry. In both areas of application, the layer systems must be chemically resistant and mechanically durable. There are standardised tests for the comparable evaluation of these characteristics such as boiling in 5% hydrochloric acid and various friction tests.

At the same time, the layer systems must exhibit a high level of permeability for visible light (transmission)—transmission levels of approx. 75% to 80% are preferred—and a high level of reflectivity for radiation in the wavelength range of a few µm—the so-called near infrared range. These special wavelength-dependent transmission and reflection properties characterise the layer systems that are primarily used for filtering sun and heat, the known solar management (also solar control) systems. However, in special applications, a high level of reflectivity in the infrared range is also required, which is reflected in the emission behaviour of the layer system.

A further important characteristic of this sun-filtering layer system applied to glass is the possibility it offers for thermal treatment as it is, for example, used in tempering for the manufacture of safety glass for architecture and the automobile industry or for shaping glass for windscreens. As it is necessary in various applications to carry out the coating before thermal treatment for the cost-effective manufacture and attainment of homogenous layers, the layer systems must show mechanical, chemical and optical characteristics that will not worsen or significantly worsen with the various thermal treatments with different temperature and time regimes according to application.

In U.S. Pat. No. 6,159,607, a layer system was described that for the most part meets these requirements. According to this, a metal layer of nickel or a nickel alloy that shows the required reflection characteristics for infrared rays is covered by a stochiometric silicon nitride layer ($Si_3N_4$) that in turn makes the layer system mechanically and chemically durable.

The metal layer containing nickel shows no decrease in emission property following thermal treatment. However, it has been shown that in the course of heat treatment, diffusion processes, in particular of the nitrogen from the silicon nitride into the metal layer and of the nickel in the reverse direction, occur.

As a result of this process, depending on the temperature and length of thermal treatment, colour displacements may occur compared to non-thermally treated coating systems, which is particularly undesirable for use in architecture. For instance, in facade planning, for cost reasons, thermally treated safety glass is only used where it is actually necessary for avoiding accidents so that non-thermally treated and thermally treated glass is always used together and any colour differences are therefore particularly apparent.

As such colour differences are also undesirable for infrared-reflective layer systems in the further infrared range with wavelengths of approximately 10 µm, an anti-migration layer, preferably containing nickel chromium oxide, was inserted in such a layer system described in WO 02/092527 between the reflection layer and a dielectric layer arranged above it, which can also be made from silicon nitride. This anti-migration layer should compensate for the diffusion processes that lead to colour shifts during and after the thermal treatment. However, practical trials have shown that this only works in certain thermal treatment processes.

A further possibility to avoid colour variations in adjacent, thermally treated and non-heat treated glass is described in EP 0646 551. According to this, along with the mechanical and chemical characteristics, the optical characteristics of the layer system in particular are precisely set with the use of a further silicon nitride layer below the infrared-reflecting metal layer as well as variable thicknesses of one or both silicon nitride coatings as a result of which specific, minimal colour differentiations can be created so that after the thermal treatment, no visible colour differences remain and this coated glass can be used in one facade. However, for this process, two different layer systems that are precisely compatible with each other and the thermal treatment must be manufactured. This matching of the coating systems is necessary for every colour to be used and therefore very cost-intensive and inflexible as well as only possible insofar as the required mechanical and chemical durability of the respective layer system permits.

The use of different, matching layer systems in an application can only be avoided through layer systems that do not significantly change their optical characteristics even during such thermal treatments in which, in terms of length and treatment temperatures, the usual ranges within the various processes can be fully utilised and both parameters can be flexibly selected at the same time. To this end, a layer system is described in U.S. Pat. No. 6,524,714 in which, instead of the known nickel-containing reflective layer, an at least partially nitrided metal layer is used, preferably a nickel-or chrome-containing metal nitride. The level of nitridation of the metal is regulated through the nitrogen portion in the working gas of the coating section on which the metal is applied.

Through the nitridation of the reflecting metal layer, the described diffusion processes in the layer system, particularly of the nitrogen, and therefore its colour shifts, are reduced at least in the framework of the described thermal treatments of 10 minutes at 625° C. A layer system with the same but nitride-free metal layer and that has undergone the same thermal treatment serves as a comparison.

However, the nitridation of the metal is linked with a decrease in reflective properties, particularly in the infrared range, as well as a reduction in mechanical and chemical durability. The reduced durability can be balanced out through a modification of the silicon nitride layers. However, this is then in every case linked to a change in the optical properties so that a compromise must be found between colour shifts and durability.

Furthermore, it is necessary to subject such a reflective layer system to more flexible thermal treatment processes and in this way meet the requirements in terms of mechanical, chemical and optical properties. This is why the invention has the task of portraying a layer system that filters sun and can be applied to glass by means of a vacuum coating process, and a method for producing the same that can be variably thermally treated and that, while maintaining chemical and mechanical durability, does not evince any visible colour shift.

BRIEF SUMMARY OF THE INVENTION

To achieve the aim of the invention, both at least one series of metal layers and one series of upper and lower dielectric layers are configured as a sandwich system in which a metal layer consisting of at least one individual layer is encapsulated by an upper and a lower intermediate layer consisting of the hypostochiometrically nitrided or oxidised metal of the metal layer and in which the upper as well as the lower dielectric series of layers possesses a stochiometric layer of a metal or semiconductor oxide or metal or semiconductor nitride as well as at least one further hypostochiometric layer of the same metal or semiconductor oxide or metal or semiconductor nitride, whereby within the dielectric series of layers, the layers are positioned such that in comparison to the neighbouring layer, the layer with the lower hypostochiometric oxygen or nitrogen portion of the metal or semiconductor oxide or metal or semiconductor nitride always lies on the side with the metal layer.

In this respect, according to the invention, each of the sandwich systems is to be understood as a system of individual layers with defined oxygen or nitrogen portions for each individual layer and can naturally possess more than one hypostochiometric layer.

The execution according to the invention of each of the three fundamental components of the layer system as a separate sandwich system with the hypostochiometric oxygen and/or nitrogen portion that is graduated from sandwich layer to sandwich layer in the direction of the neighbouring sandwich systems but uniform within each sandwich layer permits, on the one hand, the use of the oxide-free and nitride-free metal layer as a reflective coating for radiation in the near infrared range with its very good reflective qualities, and on the other hand, minimisation of the mutual influencing of the metal and stochiometric dielectric layer, referred to in short below as functional layers, to such an extent that even during thermal treatment with higher temperatures and of longer duration or during alternating processes during the course of the treatment, possible discolorations are very low and therefore not visible.

The minimum of two hypostochiometric oxide and/or nitride layers each arranged between the functional layers act to a certain extent as a buffer during the thermal treatment for the layer components diffusing from the functional layers without negatively influencing the mechanical, chemical and further optical properties of the whole layer system. This buffer effect occurs in that the hypostochiometric layers prevent a higher grade of oxidation or nitridation of the infrared radiation-reflecting metal layer during as well as after the thermal treatment.

According to the invention, it is not necessary for all three functional layers to be equally either oxidised or nitrided. A change from oxidation to nitridation from one sandwich system to the other is also possible.

Through the use of the metal layer as a reflective coating, it is also simultaneously possible to set a defined colour, reflection or absorption in the known way via the thickness of the metal layer whereby it is understood that that the glass substrate itself, to which the layer system is applied, can possess its own possibly differing colouring.

A further significant advantage of the layer system according to the invention is that through the variation options of the individual sandwich systems, the coating processes can be very flexibly configured with a system configuration which on the one hand makes manufacturing of small batches possible and on the other hand makes lower system costs possible.

For this reason, the embodiment of the invention enables the oxygen or nitrogen portion of at least one of the sandwich systems to be continuously reduced as a gradient respectively from the middle metal or stochiometric layer to the neighbouring sandwich system. Insofar as the construction of the sun-filtering layer system from the three sandwich systems is maintained in that numerous thin sandwich layers with lower oxygen or nitride portions are arranged to the adjacent sandwich system, it has been proven that the described buffer function can be carried out.

In so far as the dielectric of the layer systems is a nitride, oxide or oxynitride from silicon in accordance with a particularly advantageous embodiment of the invention, functional layers can be manufactured by means of a proven coating process whose properties, particularly their influence on sun-filtering properties and the mechanical and chemical durability of the layer system, are known and tested. The layer system can then be varied in such a way that its properties can be specifically adjusted to the requirements of the respective application.

For the dielectric of the layer systems, a nitride or oxide of another metal or semiconductor can likewise be used in accordance with other embodiments according to the invention in so far as this nitride or oxide has a highly refractive refraction index comparable to that of the silicon nitride, in particular in a range from approx. 2.0 to 2.7 measured at a wavelength of 550 nm, and therefore is suitable for use in sun-filtering systems in terms of its absorption behaviour. Materials such as titanium, tin, zinc, bismuth, niobate, tantalum or a mix or alloys thereof have proved to be suitable.

Along with optical properties, a criterion for the selection of material is its availability as a target for the coating system, for example in a particular form in which it can be particularly effectively manufactured.

In accordance with the invention, embodiments with a metal layer made from Ni:Cr alloy or pure chrome have shown to be particularly advantageous. The choice of the metal layer affects reflection and absorption in various wavelength ranges so that specific optical properties can be set with a targeted selection of materials. Ni:Cr is particularly suitable for solar management layers, i.e. in the wavelength range of the visible light and near-infrared radiation, although with greater coating thicknesses this also shows more reflection in the further infrared range, which causes a lower transmission of the visible range. Also, Ni:Cr alloys and chrome show themselves to be significantly more resistant, i.e. mechanically and chemically more durable during thermal treatment, than, for example, silver.

A particularly advantageous embodiment of the invention allows for the metal layer itself to be split into at least three individual layers of such metals that possess an electric conductivity of 107 S/m. With the help of selected materials of the individual layers of the reflecting metal layer with defined dielectric properties, it is possible to set precise wavelength-dependent reflection behaviour appropriate to the application. In this instance, silver, copper, gold, platinum or alloys thereof are also possible as the middle individual layers of the metal layer along with the metals named.

Silver and copper, which possess an electric conductivity of approximately 6*107 S/m, or also gold, whose electric conductivity is somewhat lower, are, for example, metals with higher reflection capabilities in the infrared range than, for example, nickel and chrome whose electric conductivity is only around a sixth of that. By embedding layers with such high reflectivity in the further infrared range inside the metal layer, which is arranged according to the invention within the metallic sandwich system, which is in turn arranged between the two dielectric sandwich systems, thermally treatable infrared radiation-reflecting layer systems are also possible as a special embodiment.

Other characteristics of the layer system according to the invention required by the appropriate application can be equally advantageously manufactured through a further splitting of the metal layer combined with an appropriate selection of materials. A further particular advantage of this embodiment of the split metal layer in which the actual optically effective layer is encapsulated in at least two individual layers can be found in that the encapsulated layers can serve as sacrificial layers in the coating process, particularly in the case of an inline coating system. As the metal layer is flanked on both sides by a hypostochiometric oxide or nitride layer and the silver in particular binds oxygen during the coating process and that in turn leads to a worsening of the reflective characteristics of the silver, complex gas separations before and after the silver coating process are required. The embedding of the optically effective individual layers in the aforementioned metallic sacrificial layers is in contrast significantly more favourable in terms of the process.

The periodic continuation, provided for in another embodiment of the invention, of the assembly sequence of the lower and upper dielectric layer systems and the metal layer system of the layer system through at least one further metal layer system and a further adjacent dielectric layer system allows for the improvement or targeted variation of the emission characteristics of the sun and heat-filtering system. In this case it is particularly important that in each of the sandwich systems following each other, the individual sandwich layers are arranged in such a way that the oxygen or nitrogen deficit of the hypostochiometric layers always rise to the metal layer system bordering the respective sandwich system.

In accordance with the requirements of the sun-filtering system or, as described above, of an infrared radiation-reflecting layer system, which in the automobile industry significantly differ from those in architecture, their characteristics can be varied particularly by means of the layer thicknesses, whereby the upper and lower layer system is comprised of a stochiometric silicon nitride layer with a thickness of around 5.0 nm to 200.0 nm (50 Å to 2000 Å) and the thickness of the further hypostochiometric silicon nitride layers of every layer system can amount to approx. 5.0 nm to 50.0 nm (50 Å to 500 Å) in total and the metal layer in contrast can exhibit a thickness of around 1.0 nm to 100.0 nm (10 Å to 1000 Å) and every intermediate layer can exhibit a thickness of approximately 1.5 nm to 20.0 nm (15 Å to 200 Å). If the layer system is applied by means of cathode sputtering, for example, the optical properties can be set in the following ranges:

Transmission of visible light: approx. 1% to approx. 80%

Glass-sided reflection of visible light: approx. 4% to approx. 60%

Layer-sided reflection of visible light: approx. 4% to approx. 65%

Normal component of the emission capabilities: approx: 0.04 to approx. 0.65

Layer resistance: approx 2 to 700 ohm2

Sunlight transmission capabilities: approx. 1% to approx. 80%.

With such broadly comprised possible threshold values, glass substrates coated using the layer system according to the invention are possible for a wide variety of applications such as, for example, double-glazed glass for windows.

In this instance, it is possible to appropriately design the invention so that the layer thicknesses of the intermediate layers above and below the metal layer and/or of the layer systems above and below the metal layer are the same or different. The layer thicknesses can be selected independently of one another according to the properties of the layer system as a whole that are to be set.

A further possibility to influence the optical properties of the layer system according to the invention lies in the variation of the individual sandwich layers of the dielectric layer systems. Correspondingly, at least one of the hypostochiometric layers of the dielectric layer systems shows an oxygen or nitrogen deficit such that the extinction coefficient of this layer lies in the range between $1*10^{-2}$ to $1*10^{-3}$. The extinction coefficient, which expresses the material's absorption measurement of the effected dielectric sandwich coating independently of the thickness of the layer, is defined in this instance by the oxygen or nitrogen deficit of the hypostochiometric layer of the metal oxide or semiconductor oxide or the metal or semiconductor nitride and should lie in the aforementioned range in order to ensure the required transmission properties.

In this case, a preferable embodiment is one in which at least one hypostochiometric layer of the dielectric layer systems possesses an oxygen or nitrogen deficit that is such that the extinction coefficient of this layer lies in the range of $2*10^{-3}$ to $3*10^{-3}$. In this case it is also possible that all hypostochiometric layers differ from one another or that each of the hypostochiometric layers arranged comparably within in each dielectric layer system towards its stoichiometric layer has uniform extinction coefficients.

In terms of method, the task is solved in that at least one of the oxide or nitride layers is applied in a reactive vacuum coating process from a metallic or semiconductor coating source and in the presence of oxygen or nitrogen as a reactive gas or in that at least one of the oxide or nitride layers is applied in a non-reactive or partially reactive vacuum coating process from a coating source which results from the hypostochiometric oxide or nitride of the material of the sandwich system and in this case no or small amounts of oxygen or nitrogen are added during the coating process.

Such reactive or partially reactive coating processes are tested and known processes along with the non-reactive processes for the selection of which process stability and costs in particular are important criteria. A particular advantage of the invention can be seen in that the sun-filtering system according to the invention can be manufactured in existing machines with this method through the aforementioned variation of the process parameters and the coating source.

While the coating of a metallic or semiconducting coating source in the reactive process must be controlled in order to ensure consistent layer properties with, for example, the known Plasma Emission Monitoring (PEM), the non-reactive or partially reactive coating process from a coating source made from a material from which the coating is also to be manufactured is sufficiently stable alone. In contrast, the manufacture of the coating sources is clearly more expensive especially as for every individual layer of the various sandwich systems, a separate coating source is required in the respective composition.

Insofar as partially reactive coating processes can also be considered, it is also possible to choose a standardised composition of the coating source when there is slight gradation of the oxygen or nitrogen deficit of two neighbouring hypostochiometric layers within a sandwich system and to realise the gradation in the deficit through low-level introductions of oxygen or nitrogen to the working gas.

If, to extract the dielectric, targets are used that already consist of a hypostochiometric binding of this dielectric to be extracted, it has been shown to be advantageous if the volume portion of the oxygen or nitrogen that will be added to the working gas during the coating process is less than 10% of the volume of the working gas. In this amount, process-stable coating can still be ensured.

According to further advantageous executions of the method according to the invention, the extraction of at least one dielectric layer system from a coating source consisting primarily of silicon which shows an aluminium content of approximately 5% to 15% is carried out. This also allows for the manufacture of special forms for silicon coating sources such as, for example, pipe-shaped coating sources through the use of aluminium injection moulding.

Furthermore, the aluminium content in the silicon coating source leads to an increase in the conductivity of the coating source, which leads to an improvement of the coating process in cathode sputtering.

Because of this, the extraction of at least one dielectric layer system can also result from a coating source containing primarily silicon which has a doping that increases the electric conductivity of the silicon coating source, as doping and in particular a boron or carbon doping is known to lead to the increase of conductivity of the silicon coating source.

BRIEF DESCRIPTION OF THE DRAWING FIGURE

The invention will subsequently be explained in more detail using an execution example. The drawings show a schematic sectional view of the layer system according to the invention.

DETAILED DESCRIPTION

The described layer system, when viewed from glass substrate 1 to which the coating system is applied, contains the upper 2 and lower 3 dielectric layer system as well as the intermediate metal layer system 4.

The upper 2 as well as the lower 3 dielectric layer system has two discrete individual layers, respectively the upper 11 and the lower 5 stoichiometric silicon nitride layer ($Si_3N_4$) as well as the upper 10 and lower 6 hypostochiometric layer, meaning a silicon nitride layer ($Si_xN_y$) with a nitrogen deficiency. Here, the upper hypostochiometric silicon nitride layer 10 is positioned under the upper stoichiometric silicon nitride layer 11 and the lower hypostochiometric silicon nitride layer 6 is positioned above the lower hypostochiometric silicon nitride layer 5.

The metal layer system 4 has three discrete layers of which the middle one is the metal layer 8 consisting of a Ni:Cr alloy and the upper 9 and lower 7 intermediate layer consists of a hypostochiometric oxide of this Ni:Cr alloy.

For manufacture, the individual layers are applied one after the other on to a level, clean glass substrate 1 that can have a thickness in the range of 2 to 19 mm as well as a colouring such as green, grey or blue using reactive cathode splitting. In order to improve the layer system's adhesion to glass substrate 1 or to gain other special properties, commercially available suitable layers can be applied directly to glass substrate 1 that are not portrayed in detail in the figure.

First, in a nitrogen-argon atmosphere, the lower stochiometric silicon nitride layer 5 is applied to the glass substrate followed by the lower hypostochiometric silicon nitride layer 6 but with lower nitrogen levels in the process gas.

Following this is the application of the lower intermediate layer 7 composed of the Ni:Cr alloy in an oxygen-argon atmosphere with reduced oxygen levels. This is followed by the application of the Ni:Cr metal layer 8 in a pure argon atmosphere and the upper intermediate layer 9 situated above, the upper hypostochiometric 10 and the upper stochiometric 11 silicon nitride coatings in the manner described.

REFERENCE NUMBER LIST

1 Glass substrate
2 Upper dielectric layer system
3 Lower dielectric layer system
4 Metal layer design
5 Lower stoichiometric silicon nitride layer
6 Lower hypostochiometric silicon nitride layer
7 Lower intermediate coating
8 Metal layer
9 Upper intermediate coating
10 Upper hypostochiometric silicon nitride layer
11 Upper stoichiometric silicon nitride layer

The invention claimed is:

1. A layer system that filters sun and heat and can be applied to glass by a vacuum coating process, said system comprising at least one metal layer system sandwiched between an upper and a lower dielectric layer system as a sandwich system in which, within the metal layer system, a metal layer comprising at least one individual layer is encapsulated by an upper and a lower intermediate layer comprising a hypostochiometrically nitrated or oxidised metal of the metal layer and in which the lower as well as the upper dielectric layer system has a stoichiometric layer of a metal or semiconductor oxide or metal or semiconductor nitride as well as at least one further hypostochiometric layer of a same metal or semiconductor oxide or metal or semiconductor nitride wherein within the dielectric layer systems, the layers are positioned in such a way that in comparison to a neighbouring layer, the layer with the greater oxygen or nitrogen deficit of the metal or semiconductor oxide or metal or semiconductor nitride always lies on a side turned towards the metal layer.

2. The layer system that filters sun and heat according to claim 1, wherein an oxygen or nitrogen portion within the sandwich system is designed as a gradient.

3. The layer system that filters sun and heat according to claim 1, wherein a dielectric of the dielectric layer systems comprises a nitride, oxide or oxynitride of silicon.

4. A method for manufacture of a thermally treatable layer system that filters sun and heat according to claim 3, wherein extraction of at least one of the dielectric layer systems is carried out from a coating source containing primarily silicon which has an aluminium content of approximately 5 to 15%.

5. A method for manufacture of a thermally treatable layer system that filters sun and heat according to claim 3, wherein extraction of at least one of the dielectric layer systems is carried out from a coating source containing primarily silicon which has doping that increases electric conductivity of the silicon coating source.

6. The method for manufacture of a thermally treatable layer system that filters sun and heat according to claim 5, wherein the extraction of at least one of the dielectric layer systems is carried out from a coating source containing primarily silicon that has boron doping.

7. The method for manufacture of a thermally treatable layer system that filters sun and heat according to claim 5, wherein the extraction of at least one of the dielectric layer systems is carried out from a coating source containing primarily silicon which has carbon doping.

8. The layer system that filters sun and heat according to claim 1, wherein a dielectric of the dielectric layer systems comprises a nitride or oxide of a metal or semiconductor wherein a refractive index of said nitride or oxide is more highly refractive in comparison with a refractive index of silicon nitride.

9. The layer system that filters sun and heat according to claim 8, wherein the dielectric of the dielectric layer systems comprises a nitride or oxide of a metal or semiconductor that has a refractive index in the range of approx. 2.0 to 2.7 measured at a wavelength of 550 nm.

10. The layer system that filters sun and heat according to claim 1, wherein the metal layer comprises a Ni:Cr alloy.

11. The layer system that filters sun and heat according to claim 10, wherein the stochiometric layer of the upper and the lower dielectric layer systems comprises a stochiometric silicon nitride layer with a thickness of approximately 5.0 nm to 200.0 nm (50 Å to 2000 Å) and a thickness of at least one further hypostochiometric silicon nitride layer of every dielectric layer system amounts to approx. 5.0 nm to 50.0 nm (50 Å to 500 Å) in total, and the metal layer has a thickness of approx. 1.0 nm to 100.0 nm (10 Å to 1000 Å) and every intermediate layer has a thickness of approx. 1.5 nm to 20.0 nm (15 Å to 200 Å).

12. The layer system that filters sun and heat according to claim 1, wherein the metal layer comprises chrome.

13. The layer system that filters sun and heat according to claim 1, wherein the metal layer comprises at least three individual layers of a metal that has electric conductivity in a magnitude of $10^7$ s/m.

14. The layer system that filters sun and heat according to claim 13, wherein a middle individual layer of the metal layer has an electric conductivity of approximately $6*10^7$ S/m.

15. The layer system that filters sun and heat according to claim 13, wherein the layer system has at least one further metal layer system with one further adjacent dielectric layer system which constitute a periodic continuation of an assembly sequence of the lower and upper dielectric layer systems and the metal layer system.

16. The layer system that filters sun and heat according to claim 13, wherein layer thicknesses of available intermediate layers respectively above and below the metal layer and/or available dielectric layer systems respectively above and below the metal layer are identical.

17. The layer system that filters sun and heat according to claim 1, wherein at least one hypostochiometric layer of the dielectric layer systems has such an oxygen or nitrogen deficiency that an extinction coefficient of said hypostochiometric layer lies in a range between $1*10^{-2}$ to $1*10^{-3}$.

18. The layer system that filters sun and heat according to claim 17, wherein at least one hypostochiometric layer of the dielectric layer systems has such an oxygen or nitrogen deficiency that the extinction coefficient of said hypostochiometric layer lies in a range between $2*10^{-3}$ to $3*10^{-3}$.

19. A method for manufacture of a thermally treatable layer system that filters sun and heat according to claim 1 in which individual layers are applied one after an other to a glass substrate by means of a vacuum coating wherein at least one of the oxide or nitride layers is applied in a reactive vacuum coating process from a metallic or semiconductive coating source and in presence of oxygen or nitrogen as a reactive gas.

20. A method for manufacture of a thermally treatable layer system that filters sun and heat according to claim 1 in which individual layers are applied one after an other to a glass substrate by means of a vacuum coating wherein at least one of the oxide or nitride layers is applied in a nonreactive or partially reactive vacuum coating process from a coating source which is composed of the stochiometric or hypostochiometric oxide or nitride of material of the sandwich system and wherein no or only small amounts of oxygen or nitrogen are added to a working gas during the coating process.

21. The method for manufacture of a thermally treatable layer system that filters sun and heat according to claim 20, wherein oxygen or nitrogen with a volume content of less than 10% of a volume of the working gas is added to the working gas during the coating process.

* * * * *